US012282091B2

(12) United States Patent
Arage et al.

(10) Patent No.: US 12,282,091 B2
(45) Date of Patent: Apr. 22, 2025

(54) POLARIZATION SELECTIVE COATING ADDITIVES FOR SENSOR APPLICATIONS

(71) Applicant: GM Global Technology Operations LLC, Detroit, MI (US)

(72) Inventors: Alebel H. Arage, Lake Orion, MI (US); Michael Dziatczak, Shelby Township, MI (US); Kubilay Sertel, Hilliard, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 359 days.

(21) Appl. No.: 17/852,835

(22) Filed: Jun. 29, 2022

(65) Prior Publication Data

US 2024/0004059 A1    Jan. 4, 2024

(51) Int. Cl.
| | |
|---|---|
| *G01S 13/931* | (2020.01) |
| *C09D 7/40* | (2018.01) |
| *C09D 7/62* | (2018.01) |
| *B60R 11/00* | (2006.01) |
| *C08K 7/00* | (2006.01) |

(52) U.S. Cl.
CPC .............. *G01S 13/931* (2013.01); *C09D 7/62* (2018.01); *C09D 7/70* (2018.01); *B60R 11/00* (2013.01); *C08K 7/00* (2013.01); *C08K 2201/016* (2013.01); *G01S 2013/93275* (2020.01)

(58) Field of Classification Search
None
See application file for complete search history.

(56) References Cited

U.S. PATENT DOCUMENTS

| | | | |
|---|---|---|---|
| 8,846,194 B2* | 9/2014 | Maruoka | C09D 5/36 428/324 |
| 11,967,764 B1* | 4/2024 | Lim | H01Q 21/0006 |
| 2022/0272801 A1* | 8/2022 | Kinzer | H05B 6/6473 |
| 2023/0166324 A1* | 6/2023 | Maile | H01Q 1/42 148/513 |
| 2023/0221481 A1* | 7/2023 | de Mersseman | G01S 17/931 342/52 |
| 2023/0340282 A1* | 10/2023 | Gumsheimer | C09C 1/0015 |

FOREIGN PATENT DOCUMENTS

| | | |
|---|---|---|
| DE | 3118256 A1 | 12/1982 |
| DE | 102009029763 A1 | 12/2010 |
| JP | 2022113144 A * | 8/2022 |

* cited by examiner

*Primary Examiner* — Bernarr E Gregory
(74) *Attorney, Agent, or Firm* — Vivacqua Crane, PLLC

(57) ABSTRACT

A radar packaging component including a coating affixed on a substrate. The coating includes a binder and a plurality of acicular flake particles dispersed in the binder. The acicular flake particles exhibit a length and the length of at least 30 percent by volume of the acicular flake particles is oriented in a first axis. A vehicle includes a radar packaging component and a radar sensor positioned under the radar packaging component.

20 Claims, 10 Drawing Sheets

| Transmission loss (dB) | Radar Sensing range degradation (%) |
|---|---|
| 0 | 0 |
| 1 | 5.9 |
| 2 | 11.8 |
| 3 | 16.5 |
| 4 | 20.8 |
| 5 | 25.5 |
| 6 | 29.4 |
| 7 | 33.3 |
| 8 | 37.3 |
| 9 | 40.8 |
| 10 | 43.9 |
| 11 | 47.2 |
| 12 | 50.2 |
| 13 | 52.9 |
| 14 | 55.3 |
| 15 | 58.1 |
| 16 | 60.4 |
| 17 | 62.8 |
| 18 | 64.7 |
| 19 | 66.7 |
| 20 | 68.6 |
| 21 | 70.2 |
| 22 | 72.2 |
| 23 | 73.7 |
| 24 | 74.9 |
| 25 | 76.5 |
| 26 | 77.7 |
| 27 | 79.2 |
| 28 | 80.4 |
| 29 | 81.2 |
| 30 | 82.4 |

FIG. 5D

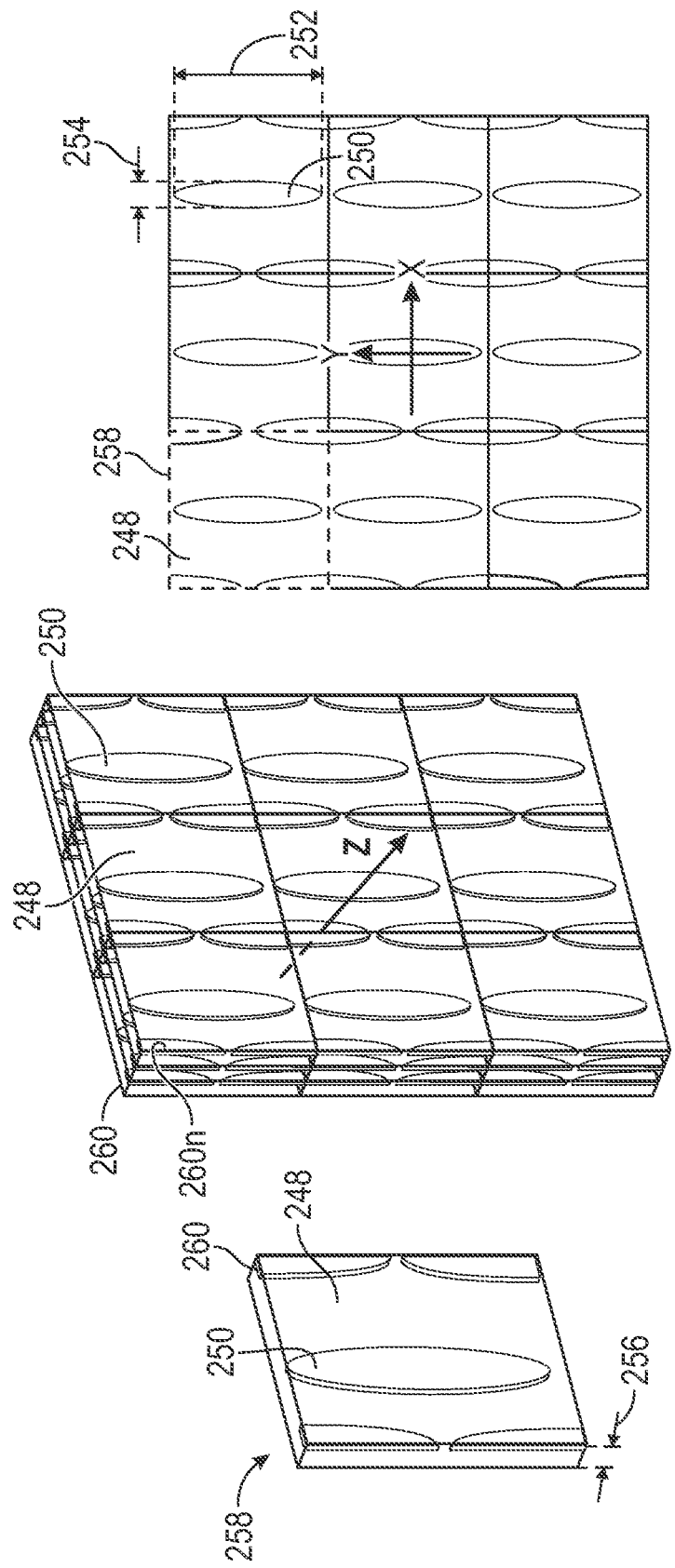

POLARIZATION SELECTIVE COATING ADDITIVES FOR SENSOR APPLICATIONS

INTRODUCTION

Numerous sensors are utilized to facilitate various levels of automated driving assistance, from task specific driving assistance to complete autonomous driving. Sensors include active sensors such as ultrasonic sensors, radar, and LiDAR, as well as passive sensors such as cameras. Some sensors, such as radar, may be positioned underneath various panels of the vehicle body, such as behind bumper facia, hood, door panels, exterior trim panels, or fenders.

The vehicle body panels and sensor packaging, are formed from various materials and covered by paint or other coatings. Some previously desirable coating and paint additives led to radar sensing performance degradation through reflection, attenuation, scattering, and phase distortion. As the degradation may then cause measurement error or artifacts in the detected radar signal, the additives may no longer be utilized in their current form, and the visual effects created by the additives may no longer be achieved.

Thus, while current coating systems for vehicle body panels achieve their intended purpose, there is a need for new coating systems for use in conjunction with radar sensors located underneath body panels.

SUMMARY

According to several aspects, the present disclosure relates to a radar packaging component. The radar packaging component includes a substrate and a coating affixed on the substrate. The coating includes a binder and a plurality of acicular flake particles dispersed in the binder. The plurality of acicular flake particles exhibits a length, and the length of at least 30 percent by volume of the acicular flake particles are oriented along a first axis.

In aspects of the above, the coating exhibits a metallic finish.

In any of the above aspects, the acicular flake particles are present in a range of 10 percent to 40 percent of the total volume of the binder and acicular metallic flake particles.

In any of the above aspects, the acicular flake particles each exhibit a width and a thickness, and the ratio of the average length to average width is in the range of 4:1 to 100:1 and the ratio of the average width to average thickness is in the range of 10:1 to 1000:1.

In any of the above aspects, the acicular flake particles are acicular metallic flake particles including one or more of the following: metal particles, metal alloy particles, metal-polymer film composites.

In any of the above aspects, the metals and metal alloys include, for example, one or more of the following metals: silver, tin, iron, bronze, copper, silicon, aluminum, zinc.

In aspects of the above, the acicular flake particles further includes one or more of graphene, semiconductors, mica particles, titanium oxide, strontium aluminate, chromium oxide, silica, iron oxide, tin oxide, tin dioxide, ferric ferrocyanide, manganese violet, ultramarine blue, carbon black, and titanium dioxide.

In any of the above aspects, the radar packaging component also includes a radar sensor positioned behind the radar packaging component and emits radio waves in one or more of the following bands: 24, 76, 79, 90, 120, 140 and 240 GHz.

In any of the above aspects, the radar packaging component is one of the following components: a bumper facia, a grill, an emblem, a windshield, a window, an exterior light, and an electronic device.

According to several aspects, the present disclosure relates to a vehicle. The vehicle includes a radar packaging component, according to any of the above embodiments, and a radar sensor positioned under the radar packaging component. The radar packaging component includes a substrate, and a coating affixed on the substrate. The coating includes a binder, and a plurality of acicular flake particles dispersed in the binder. The acicular flake particles exhibit a length and the length of at least 30 percent by volume of the acicular flake particles is oriented in a first axis.

According to aspects of the above, the coating exhibits a metallic finish.

According to any of the above aspects, the radar packaging component is one of the following components: a bumper facia, a grill, an emblem, a windshield, a window, and an exterior light.

According to any of the above aspects, the radar packaging component is a bumper facia.

According to the above aspects, a bracket holds the radar sensor to the bumper facia.

According to any of the above aspects, the acicular flake particles are present in a range of 10 percent to 40 percent of the total volume of the binder and acicular flake particles.

According to any of the above aspects, the acicular flake particles each exhibit a width and a thickness, and the ratio of the average length to average width is in the range of 4:1 to 100:1 and the ratio of the average width to average thickness is in the range of 10:1 to 1000:1.

According to any of the above aspects, the acicular metallic flake particles include one or more of the following: metal particles, metal alloy particles, and metal-polymer film composites.

According to aspects of the above, the metals and metal alloys include, for example, one or more of the following metals: silver, tin, iron, bronze, copper, silicon, aluminum, zinc.

According to any of the above aspects, the acicular flake particles further includes one or more of graphene, semiconductors, mica particles, titanium oxide, strontium aluminate, chromium oxide, silica, iron oxide, tin oxide, tin dioxide, ferric ferrocyanide, manganese violet, ultramarine blue, carbon black, and titanium dioxide.

According to aspects of the above, the radar packaging component is a bumper facia, the coating exhibits a metallic finish, the acicular metallic flake particles are present in a range of 10 percent to 40 percent of the total volume of the binder and acicular metallic flake particles, and the coating exhibits a first permittivity in the first axis that is about 25 percent of a second permittivity of the coating in a second axis, wherein the second axis is perpendicular to the first axis.

BRIEF DESCRIPTION OF THE DRAWINGS

The drawings described herein are for illustration purposes only and are not intended to limit the scope of the present disclosure in any way.

FIG. 5D is a table illustrating the effect of range degradation as correlated to transmission loss.

FIG. 6A illustrates a unit of area of a coating including acicular metallic flake particles, according to an embodiment of the present disclosure.

FIG. 6B illustrates a side view of multiple unit cells of multiple, stacked coating layers of the coating of FIG. 6A, according to an embodiment of the present disclosure.

FIG. 6C illustrates a front view of multiple unit cells of the coating of FIG. 6A, according to an embodiment of the present disclosure.

DETAILED DESCRIPTION

Figure 1A:
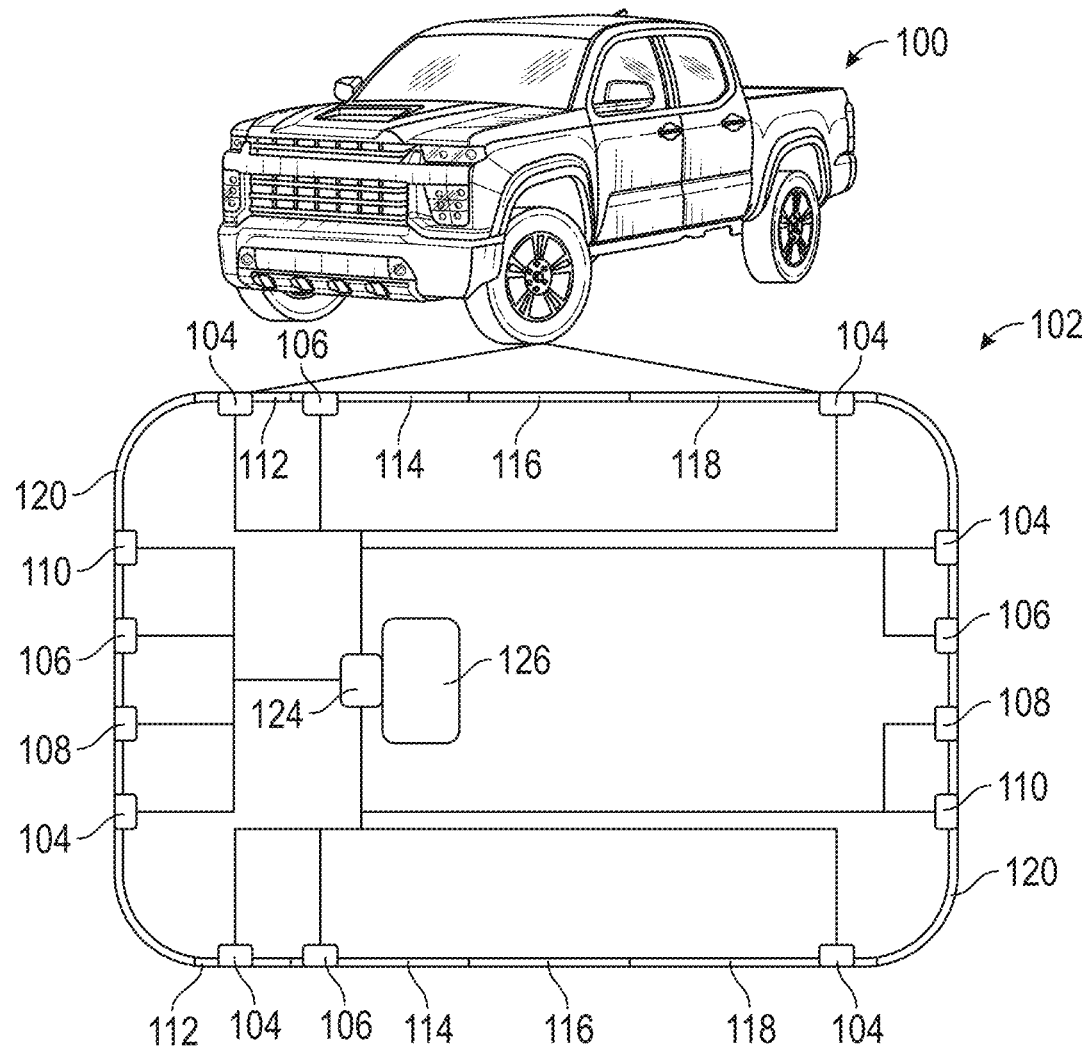
FIG. 1A illustrates a schematic drawing of a vehicle, according to an embodiment of the present disclosure.

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components that send or receive electromagnetic radiation for communication and other purposes, including personal computers, mobile phones, and other electronic devices.

The present disclosure relates to the use of polarization-selective coatings additives for sensor applications. The coating additives include metallic flakes and other flakes that are acicular in morphology for packaging radar sensors. The radar sensors include an emitter that emits radio waves in the operation frequency band of interest, including but not limited to micrometer-wave and millimeter-wave spectrum, and a detector that detects the emitted waves. Metallic flakes are understood herein as flakes that impart a metallic appearance and includes, for example, metal particles, metal alloy particles, metal-polymer film composites, or mica particles.

FIG. 1 illustrates a vehicle 100. The vehicle 100 includes a sensing system 102. The sensing system 102 includes a plurality of radio detection and ranging (radar) sensors 104. Additional sensors, such as ultrasonic sensors 106, laser identification detection and ranging (LiDAR) sensors 108, as well as cameras 110 may also be present. The radar sensors 104 are mounted behind various components, such as facia panels 112, 116, 118, 120 surrounding the vehicle. In further aspects, the radar sensors 104 may be positioned behind grills, emblems, windshields, windows, exterior lights, etc. The various components may form at least a portion of the packaging for the sensors. The radar sensors 104, ultrasonic sensors 106, laser identification detection and ranging (LiDAR) sensors 108, and cameras 110 are connected to a sensor module 124. The sensor module 124 is connected to, and in further aspects integrated into, an electronic control module 126. The modules 124, 126 utilize the data provided by the various sensors to assist the driver.

Figure 1B:
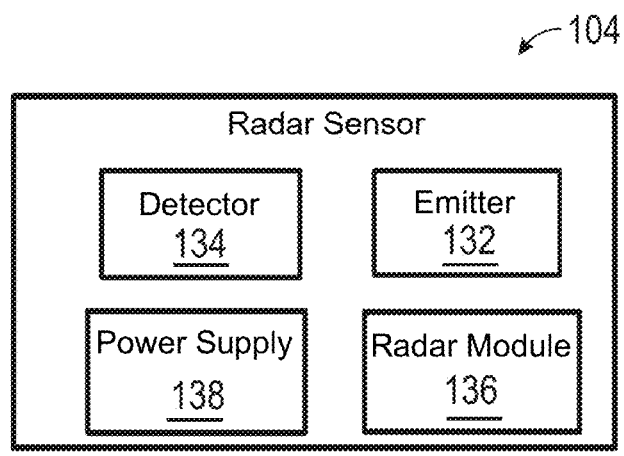
FIG. 1B illustrates a schematic drawing of a radar sensor, according to an embodiment of the present disclosure.

The various sensors 104, 106, 108 include detectors that detect electromagnetic waves of one or more given wavelengths and frequencies. In many aspects, these sensors also include emitters that emit electromagnetic waves of one or more frequencies and wavelengths corresponding to the frequencies and wavelengths the detector is configured to detect. Radar sensors 104 are used to determine the distance (ranging), angle, and radial velocity of reflective objects relative to the sensor by transmitting and detecting impulses of electromagnetic radiation (a.k.a., radio waves). The emitted radar waves are typically in the micrometer-wave and millimeter-wave bands at 24 GHz, 76 GHz, 79 GHz, 140 GHz, 240 GHz, and above. Ultrasonic sensors measure distance to objects using sound waves in the frequency band of 20 KHz to 40 KHz. LiDAR sensors 108 rely upon optical laser light transmitted in pulses to also determine the distance to objects. The laser light also exhibits electromagnetic waves, typically in the range of 905 nanometers 1550 nanometer wavelengths. FIG. 1B illustrates a radar sensor 104. The radar sensor 104 includes a detector 134, an emitter 132 (also referred to as a transmitter), and a radar module 136 including transmitter and receiver electronics as well as, in some aspects, a power supply 138. In the radar sensor 104, the detector 134 and emitter 132 each include an antenna. Similar components, i.e., emitters, detectors, modules and power supplies, may be found in ultrasonic sensors and LiDAR sensors.

Cameras 110 are a subset of sensors that include detectors that detect optical and infrared electromagnetic waves reflected or emitted from surfaces. In aspects, the electromagnetic waves detected include electromagnetic waves in the near ultraviolet, visible, and infrared spectrums. In aspects, the ultraviolet, visible, and infrared spectrums include electromagnetic waves exhibiting one or more wavelengths in a range of 380 nanometer to 850 nanometers.

The radar module 136, sensor module 124, and electronic control module 126 may each include one or more of the following: a controller, memory, interface circuits, communication links and embedded software. The controller includes, in aspects, one or more microcontrollers containing one or more central processing units, which execute processing functions including receiving signals, carrying out instructions, retrieving data, and outputting signals. When more than one controller is present, the controllers may perform processing functions serially or in parallel. Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read. The interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The various body panels and other components the radar sensors 104 sensors are positioned behind, such as the bumper facia 120, protects the radar sensors 104 from damage due to road debris, theft, vandalism, etc. For purposes of illustration, FIG. 2A through 2D depict a bumper facia 120 including multiple radar sensors 104 at least partially packaged by the bumper facia 120. While four radar sensors 104 are illustrated, it should be appreciated that fewer than four radar sensors 104 may be present in the bumper facia 120, such as from one to three radar sensors 104, including all values and ranges therein, or more than four radar sensors 104 may be present, such as from five to ten radar sensors 104 including all values and ranges therein. The bumper facia 120 may include a bracket 130 for mounting the radar sensors 104 to the bumper facia 120. The radio waves emitted by emitters 132 in the radar sensors 104 propagate through the bumper facia 120, are reflected off objects around the vehicle 100, return to the radar sensors 104, and are detected by the detectors 134, i.e., an array of receiver antennas, in the radar sensors 104, illustrated in FIG. 2C.

Figure 2A:
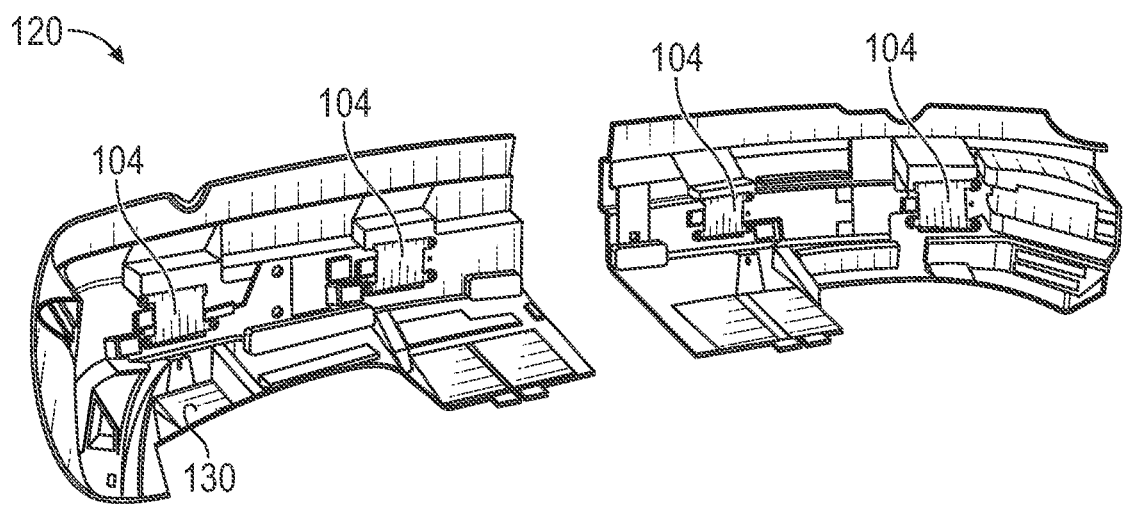
FIG. 2A illustrates a bumper facia as radar sensor packaging, according to an embodiment of the present disclosure.
Figure 2B:
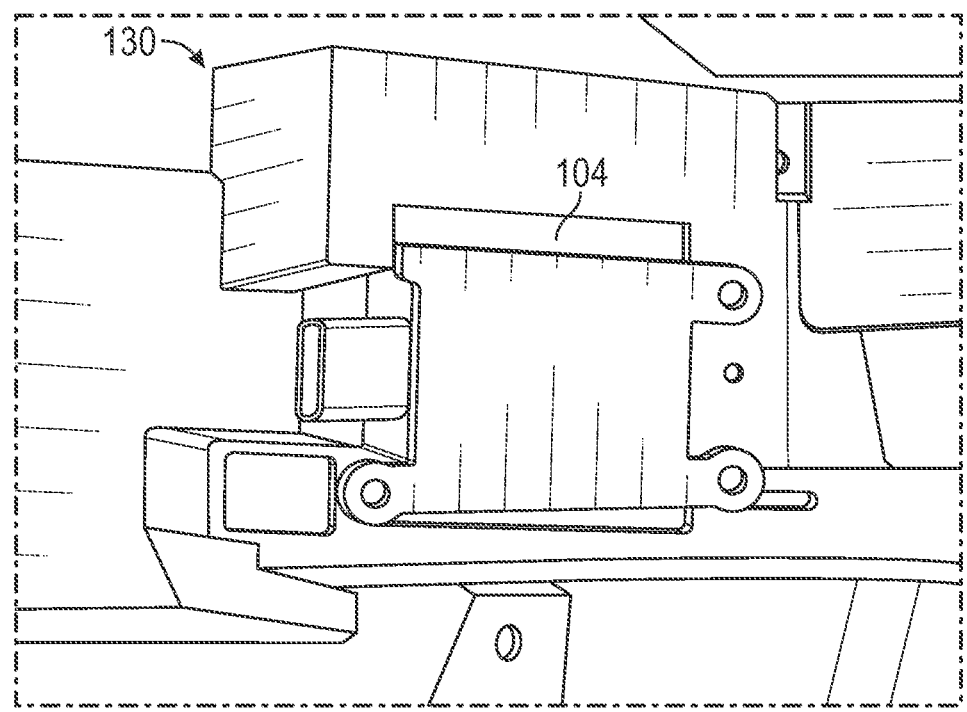
FIG. 2B illustrates a close-up of the bumper facia of FIG. 2A.
Figure 2C:
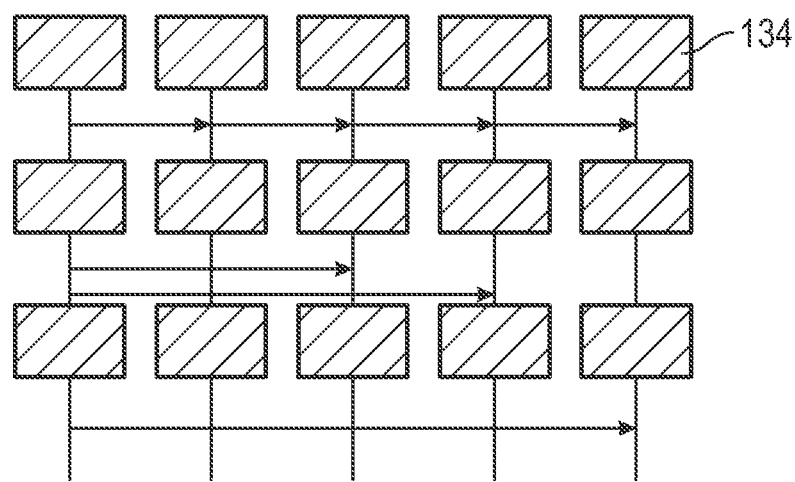
FIG. 2C illustrates a close-up of an antenna array, according to an embodiment of the present disclosure.
Figure 2D:
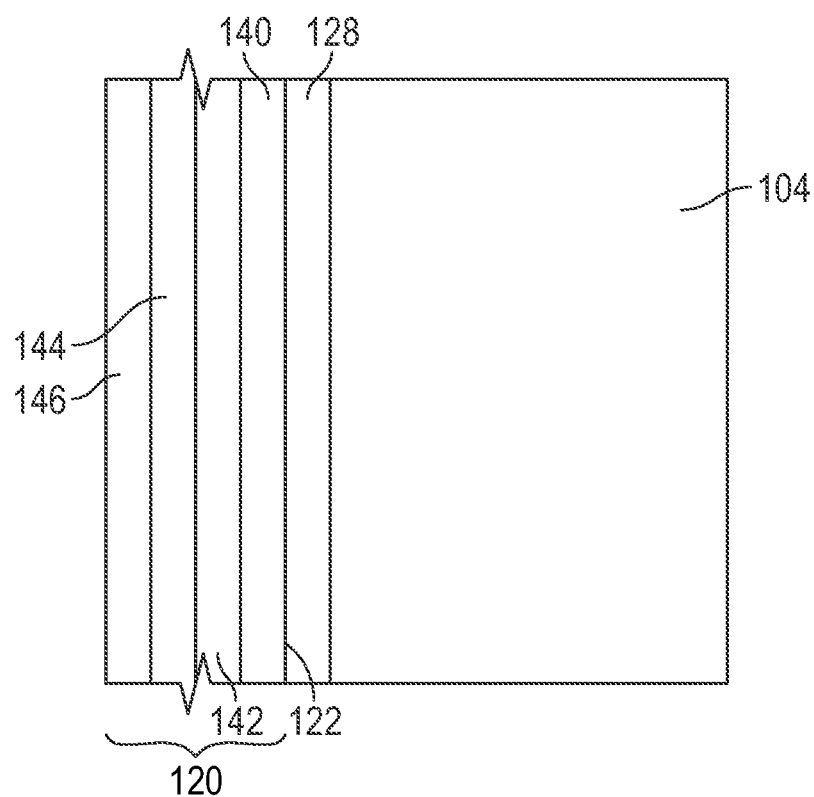
FIG. 2D illustrates a cross-sectional view of a bumper facia, according to an embodiment of the present disclosure.

Further, as illustrated in FIG. 2D, the bumper facia 120 includes a substrate 140 and several coatings affixed to the substrate 140. The coatings provide a metallic finish to the substrate 140. The radar sensor 104 is mounted underneath in the interior of the bumper facia 120. An air gap 128 is present between the radar sensor 104 and the rear face 122 of the substrate 140. The coatings include one or more of the following: a primer coat 142, one or more layers of paint 144, and a topcoat 146. In aspects, the substrate 140 is formed from one or more of the following materials: thermoplastic polymer materials, thermoset polymers, fiber reinforced composites, foams formed from either thermoplastic or thermoset polymers, thermoplastic elastomers, etc. Fiber reinforced composites include, e.g., fiberglass in epoxy or carbon fiber in epoxy. The primer coat 142 includes, for example, a urethane polymer, and provides an adhesive layer for the paint 144 and the substrate 140. The paint 144 includes one or more additives including pigments, such as metallic flakes, in a binder and imparts color and finish effects to the substrate 140. The topcoat 146 includes, for example, a urethane or an acrylic polymer, and protects the paint 144. It is often desirable to provide a metallic finish to the bumper facia 120 or other components, such as grills, emblems, windshields, windows, exterior lights, etc. to enhance the visual appearance, color gamut, shine, and translucence of the facia.

Figure 3C:
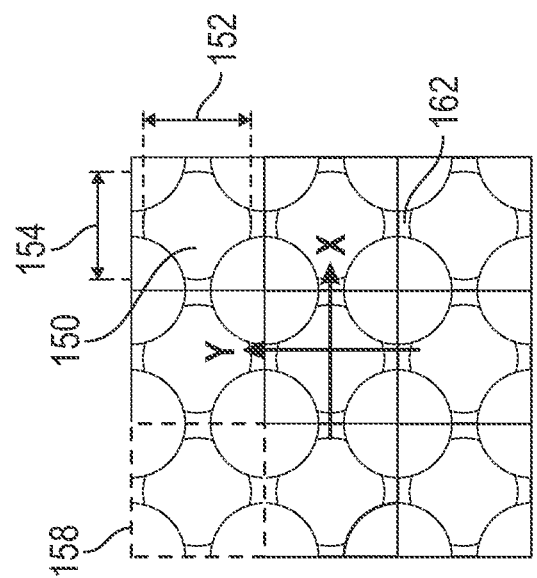
FIG. 3C illustrates a front view of multiple unit cells of the coating of FIG. 3A.
Figure 3B:
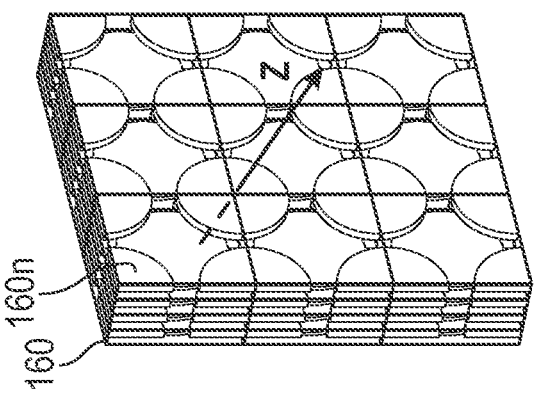
FIG. 3B illustrates a side view of multiple unit cells of multiple, stacked coating layers of the coating of FIG. 3A.
Figure 3A:
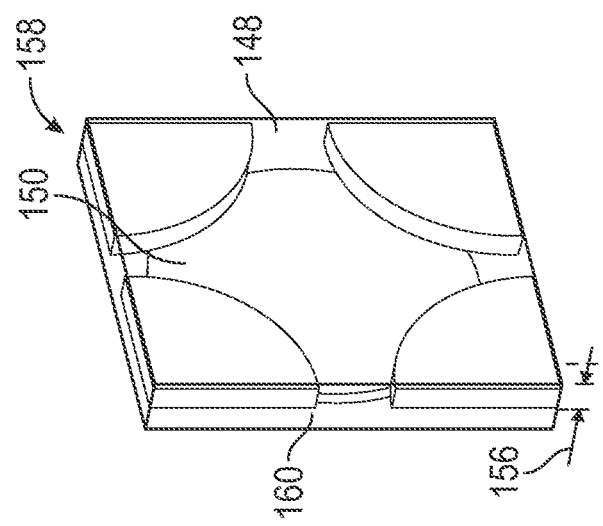
FIG. 3A illustrates a unit of area of a coating including a plate-like metallic flake particles.

While the substrate 140 and coating binders exhibit a relatively low electrical permittivity that minimally interferes with electromagnetic waves propagated by the radar sensors 104, it has been found that metallic flakes used within the paint and exhibiting a plate-like morphology, i.e., relatively circular (silver-dollar) or polygonal geometries, disrupts the functionality of the radar sensors 104 due to the electromagnetic reflective properties of metals. FIGS. 3A, 3B, and 3C, illustrate a coating including plate-like metallic flake 150 dispersed in a binder 148. The individual plate-like metallic flakes 150 exhibit an average length 152 to average width 154 ratio approaches 1:1, such as in the range of 2:1 to 1:2, and the average width 154 to average thickness 156 (see FIG. 3A) ratio approaches 10:1 to 1000:1. Individual particles of the plate-like metallic flake 150 may overlap each other in a coating layer 160, 160n. The silver-dollar-like metallic flake, in particular, exhibits an in-plane relative permittivity, i.e., a permittivity in the first plane, of greater than 10, which negatively impacts the measurements collected by radar sensors 104.

Figure 4:
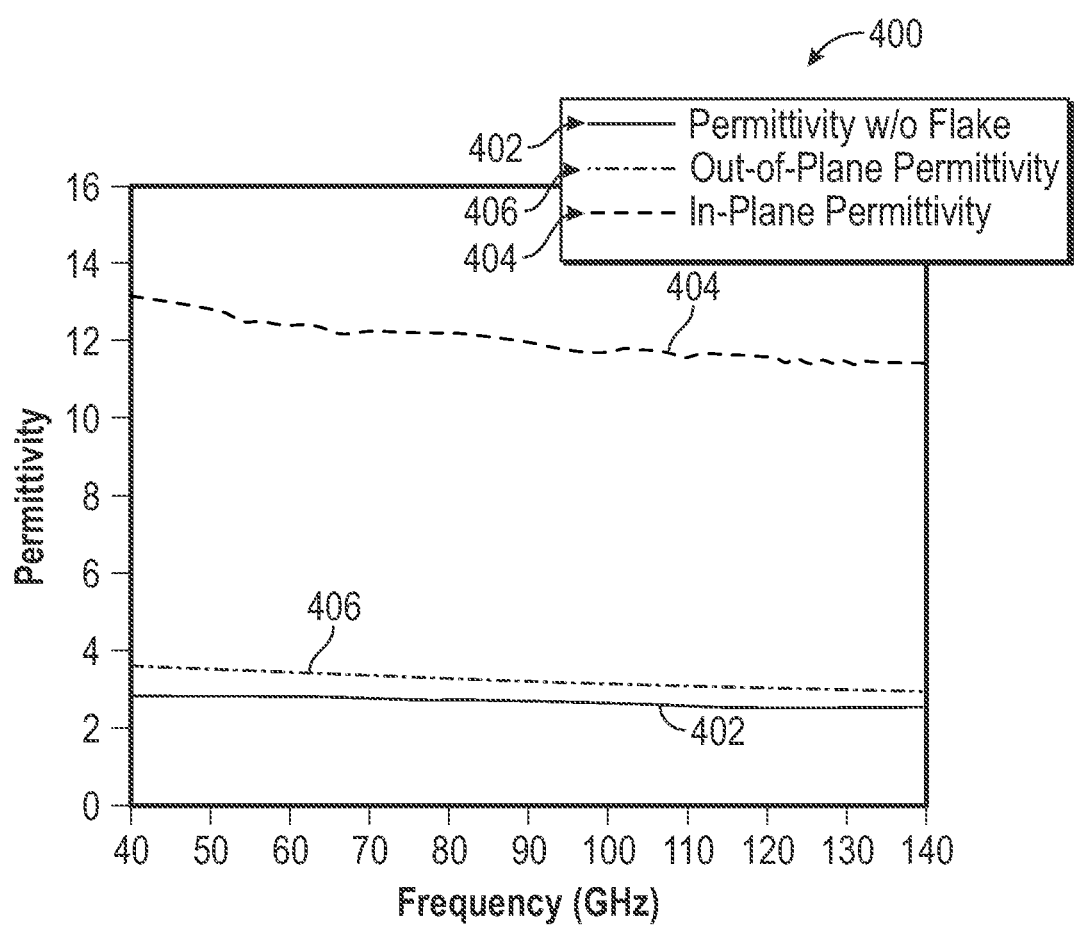
FIG. 4 illustrates the effect of plate-like metallic flake particles on permittivity of a coating.

FIG. 4 is a graph 400 that illustrates the difference between in-plane 404 and out-of-plane 406 relative permittivity for the paint layer made with the additive of plate-like, aluminum metal flakes 150 in a binder 148. In the illustrated aspect, the plate-like, aluminum metallic flake 150 is present at a volume percent of 20 of the total volume of the binder 148 for a given unit area 158. Electro-magnetic (EM) simulation model-based analyses were performed across a spectrum of radio frequencies from 40 GHz to 140 GHz. With reference to the binder permittivity plot line 402, it is seen that the metallic flake 150 in the binder 148 show significant permittivity 404 in the by the radar in a first plane, in-plane with the electric field (illustrated as the x-y plane, i.e., a first plane defined by a first axis x and a second axis y). On the other hand, relative permittivity plot line 406 indicates that out-of-plane relative permittivity in a third axis z, which is the propagation direction of the radar sensor signal, is lower than in-plane relative permittivity and closer to the permittivity of the binder seen in plot line 402. Accordingly, it is understood that the relative permittivity exhibited by the metallic flake 150 is highly anisotropic, exhibiting relatively higher in-plane permittivity than out-of-plane permittivity. This is true in both axes defining the in-plane electric field.

Figure 5A:
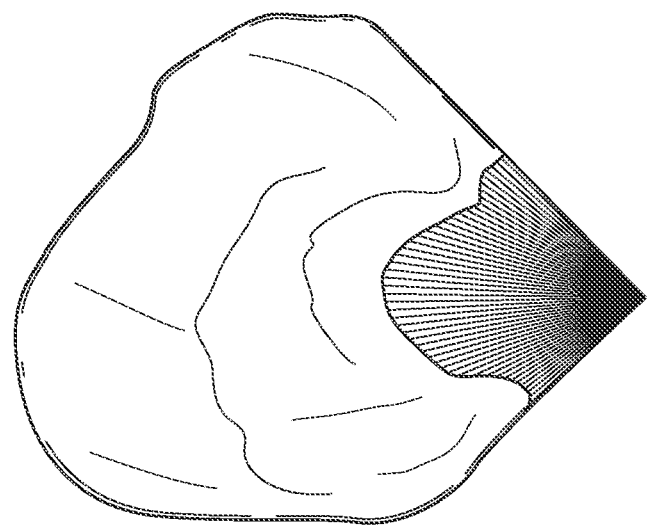
FIG. 5A illustrates a radar detection range coverage map for a radar sensor without a bumper facia positioned over the radar sensor.
Figure 5B:
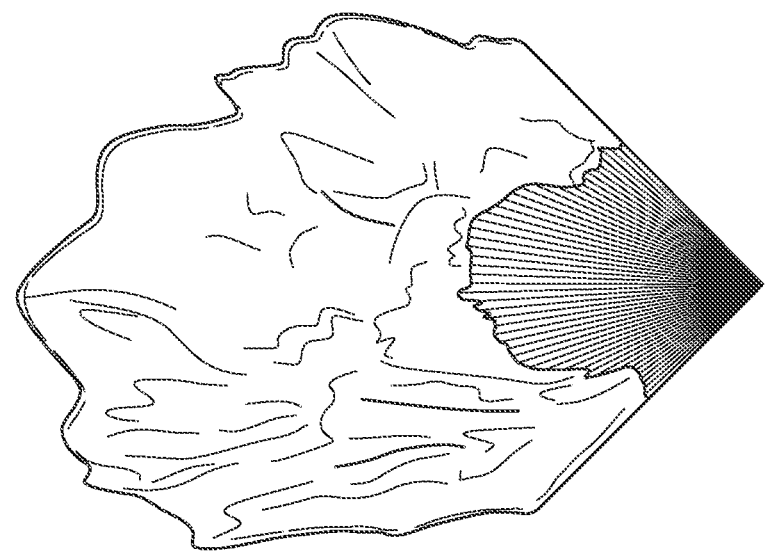
FIG. 5B illustrates a radar detection range coverage map for a radar sensor with a bumper facia including plate-like metallic flake particles in a coating affixed to the bumper facia.
Figure 5C:
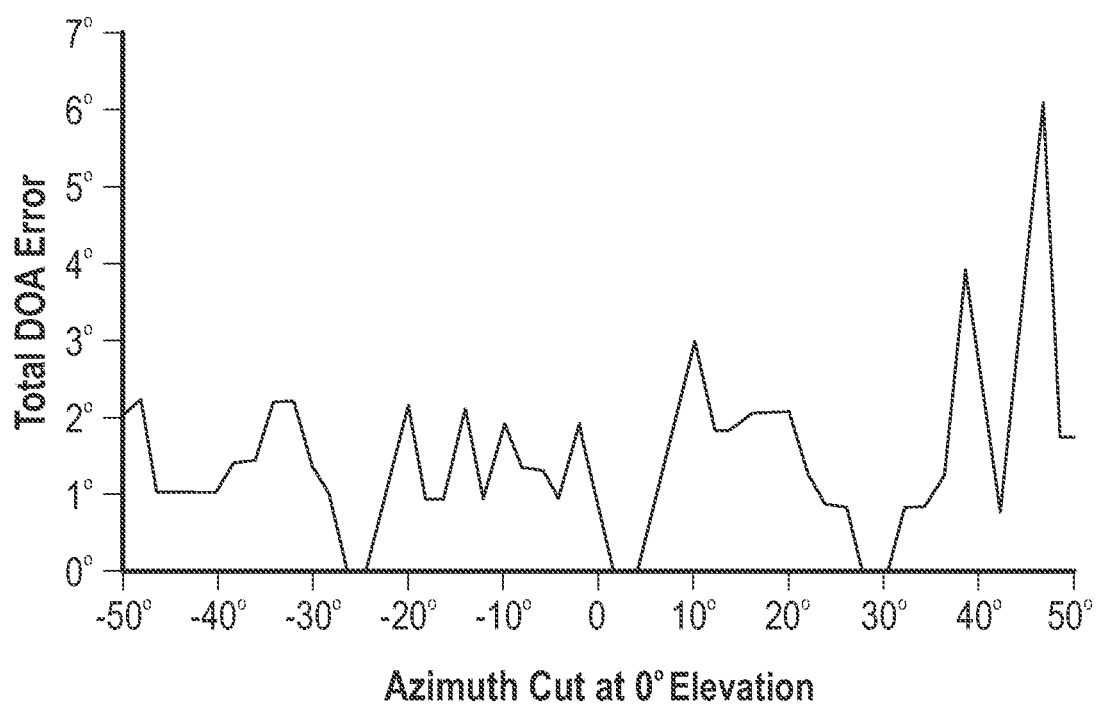
FIG. 5C is a graph illustrating the measurement error of the detection range coverage map of FIG. 5B.

Reference is now made to FIGS. 5A and 5B, which provide an illustrative example of the effects of plate-like metallic flake 150 when used in radar packaging. FIG. 5A illustrates a radar detection range coverage map measured at operating a frequency of 76.5 GHz without a painted bumper facia 120 present. FIG. 5B illustrates a radar detection range coverage map measured at an operating frequency of 76.5 GHz including a segment of a bumper facia over the radar sensor 104. The bumper facia segment includes plate-like aluminum metallic flakes 150 as a pigment in the paint coating. The plate-like, aluminum metallic flakes 150 exhibit an average length of 17 micrometer, an average width of 17 micrometer and an average thickness of 0.5 micrometer, and the plate-like aluminum metallic flake 150 is present at a 20 percent volume of the total volume of the binder and aluminum metallic flake. As illustrated, the bumper facia including the plate-like, aluminum metallic flake 150 creates significant total transmission loss and distortion of the radar radio waves as the radio waves are emitted from the radar sensor 104 through the bumper facia 120 and as the radio waves return to the radar sensor 104 through the bumper facia 120. The radio wave distortion leads to a total direction of signal arrival error across azimuth (or horizontal) angles from −50 degrees, through 0 degrees, to 50 degrees for the distortion map of FIG. 5B is illustrated in FIG. 5C. The radio wave distortion leads total direction of signal arrival error across azimuth (or horizontal) angles from −50 degrees, through 0 degrees, to 50 degrees for the distortion map of FIG. 5B is illustrated in FIG. 5C. The total transmission loss of the radio wave leads to reduced radar sensing range coverage map as illustrated in FIG. 5B.

It has been found herein that coatings including flakes, such a metallic flake, dispersed in a binder may be employed on the various radar packaging components by including polarization-selective additives exhibiting an acicular morphology, which reduces the permittivity in at least one axis in-plane of the electric field. Polarization-selective additives are understood herein as additives that restrict emitted radio waves in a first axis and allow the radio waves to pass in a second axis defining a first plane that is in-plane to the electric field of the radio waves. FIGS. 6A through 6C illustrate a coating including polarization-selective flakes 250 exhibiting an acicular morphology, enabling the use of metallic flake coatings for radar sensor packaging applications.

Particles of the acicular flake 250 are dispersed in a binder 248, such as in the paint 144, the topcoat 146, or even the substrate 140, in a volume percentage in the range of 10 percent to 40 percent of the total volume of the binder 248 and the acicular flake particles 250, including all values and ranges therein, for a given unit area 258. In aspects, the binder 248 is a thermoplastic or thermoset polymer, including one or more of the following polymers: acrylic, polyester, and polyurethane. The individual acicular flake particles 250 exhibit an average length 252 to average width 254 ratio of 5:1 or greater, such in a range of, for example, 5:1 to 100:1, including all values and ranges therein. The length is understood herein as the longest dimension exhibited by the flake and the thickness is understood as the smallest dimension exhibited by the flake. Further, the acicular flake particles 250 exhibit an average thickness 256 that is a fraction of the width 254, wherein the ratio of average width 254 to average thickness 256 is in the range of 20:1 to 1000:1, including all values and ranges therein. In aspects, the length of the acicular flake particles 250 is in the range of 5 micrometers to 100 micrometers, including all values and ranges therein, the width of the acicular metallic flake particles 250 is in the range of 1 micrometer to 20 micrometers, including all values and ranges therein, and the thickness of the acicular flake particles 250 is in the range of 0.1 micrometers to 5 micrometers, including all values and ranges therein.

In aspects, the acicular flake particles 250 include metallic flake including one or more of the following: metal particles, metal alloy particles, and metal-polymer film composites. The metals and metal alloys include, for example, one or more of the following metals silver, tin, iron, bronze, copper, silicon, aluminum, zinc. Metal-polymer film substrates include, e.g., polymer films, metallized on one or both sides, which are then comminuted. In further aspects, the acicular flake particles 250 may include pigments that may be present and facilitate creating a metallic finish, and include, for example, graphene, semiconductors, mica particles, titanium oxide, strontium aluminate, chromium oxide, silica, iron oxide, tin oxide, tin dioxide, ferric ferrocyanide, manganese violet, ultramarine blue, carbon black, titanium dioxide, etc.

The acicular flake particles 250 are oriented in the binder 248 with the largest cross-sectional area generally aligned parallel to a first plane defined by a first axis x and a second axis y, in-plane with the radar electric field, and the thickness 256 of the acicular metallic flake particles 250 oriented in the out-of-plane electric field, or the direction of the third axis z, the signal propagation direction of the radar sensor, as illustrated. In addition, the length 252 of at least 30 percent of the acicular additive particles 250 are aligned in the second axis y of the in-field electric plane, including all values and ranges from 30 percent to 100 percent, 50 percent to 100 percent, etc.

The orientation of the acicular flake particles 250 in the in-plane electric field of the emitted radio waves in the binder 248 leads to the selectivity of the polarization. That is, the acicular flake particles 250 in the binder 248 exhibit relatively low permittivity in the electric field polarization of interest, i.e., in a first axis x perpendicular to the second axis y of acicular metallic flake particle orientation; and a relatively higher permittivity in the electric field polarization of less interest, i.e., cross-polarization direction or the second axis y, which is also the axis of acicular metallic particle orientation, as depicted in FIG. 6C. The relative permittivity in the polarization direction of interest may be about 25 percent of the relative permittivity in the cross-polarization direction in-plane with the electric field. In yet further aspects, where multiple layers 260, 260n of the acicular additive particles 250 in a binder 248 are present, the acicular additive particles 250 may be aligned in the out-of-plane, z-direction, in the stacked layers 260, 260n.

Figure 7:
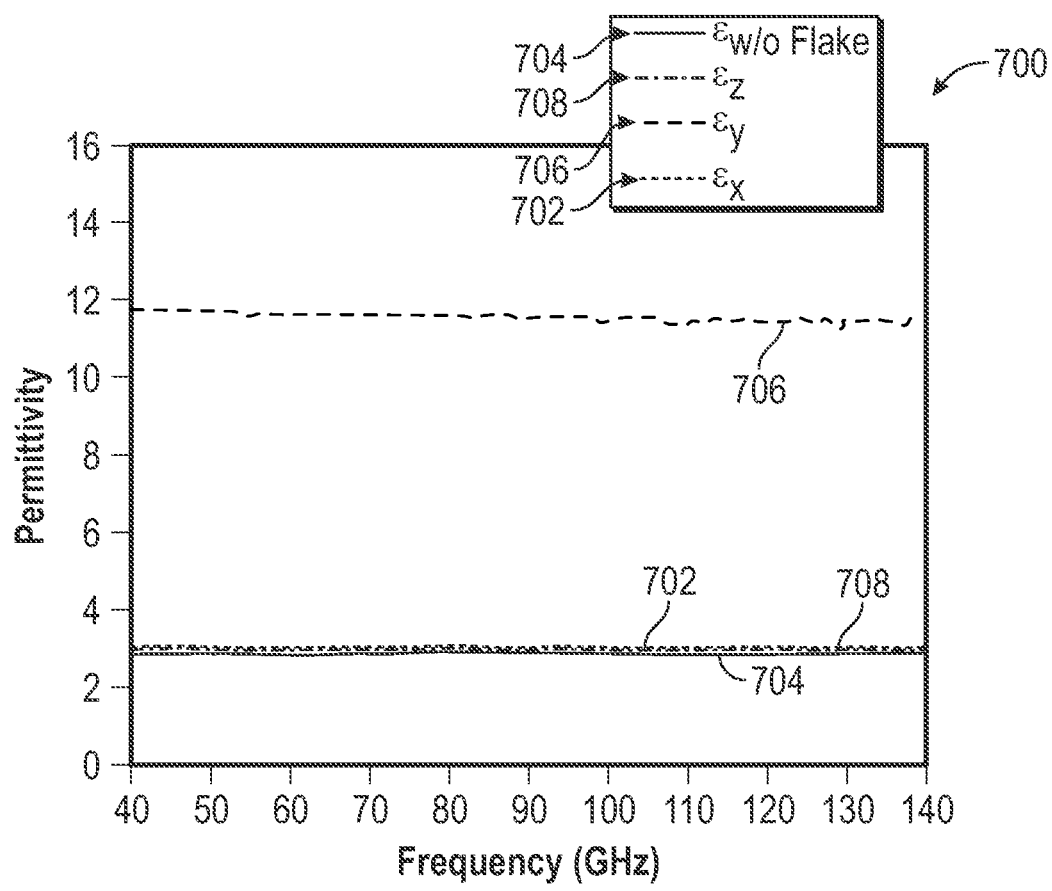
FIG. 7 is a graph that illustrates the effect of acicular metallic flake particles on permittivity of a coating in both a first axis and second axis defining a first plane parallel to the in-plane electric field of the radar sensor, according to an embodiment of the present disclosure.
Figure 8:
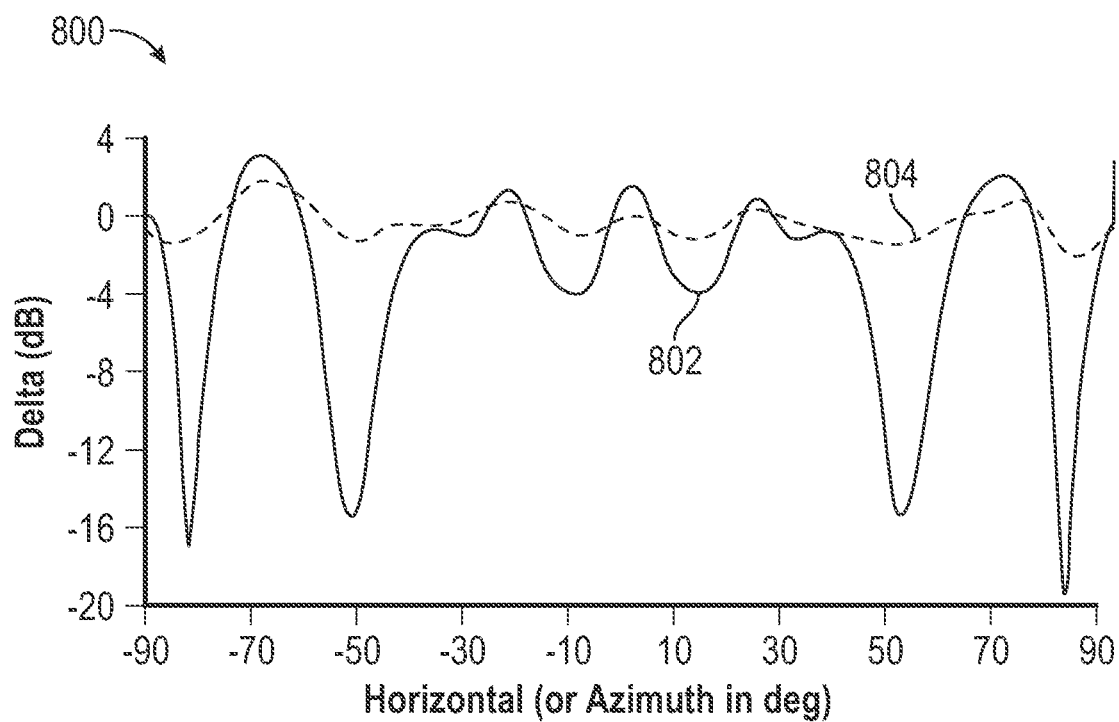
FIG. 8 is a graph that illustrates the effect of metallic flake morphology on distortion of the signal amplitude of radio waves emitted and detected by the radar sensor.
Figure 9:
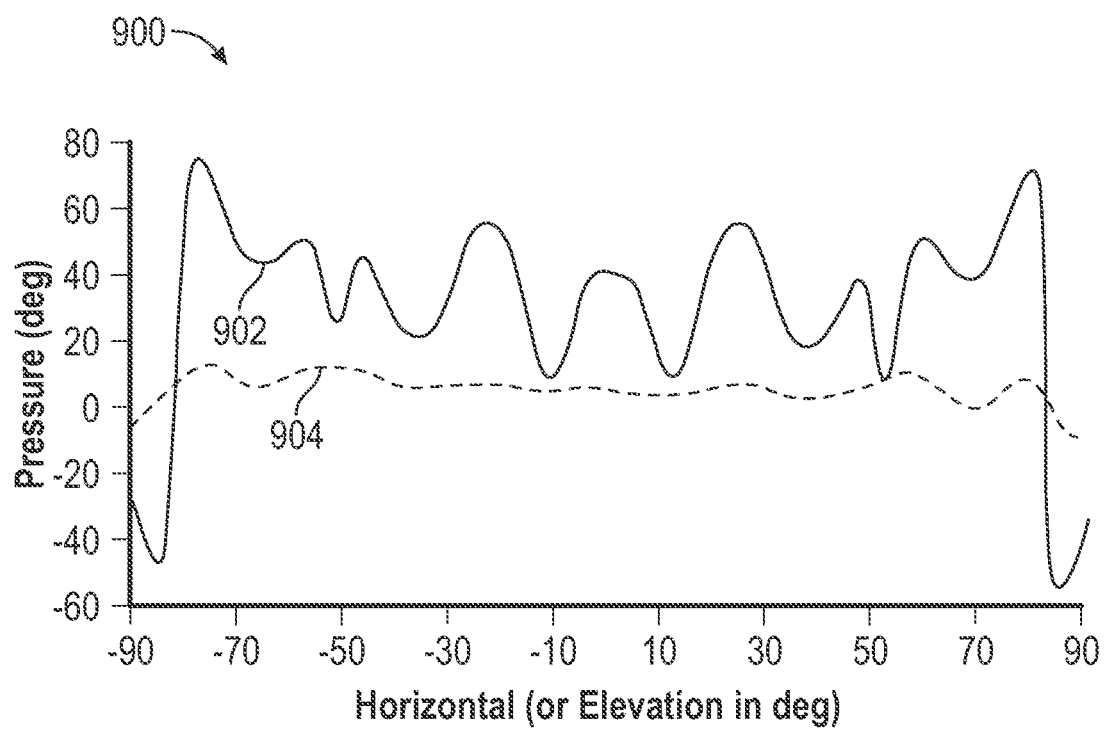
FIG. 9 is a graph that illustrates the effect of metallic flake morphology on distortion of the signal phase of radio waves emitted and detected by the radar sensor.

FIGS. 7 through 9 provide illustrative examples, which are exemplary in nature and not meant to limit the scope of the present disclosure. FIG. 7 provides a graph 700 illustrating the relative permittivity of a bumper facia segment, used in the examples above, including acicular aluminum flake present in an amount of 20 percent by volume of the binder, as compared to a bumper facia without acicular aluminum flake. Electro-magnetic (EM) simulation model-based analyses were performed across a spectrum of radio frequencies from 40 to 140 GHz. With reference to relative permittivity plot line 702, as the acicular metallic flake is oriented along its length in the y direction, the in-plane permittivity component in the first direction, the x-direction, is significantly reduced to a level of binder permittivity, permittivity plot line 704 and in-plane permittivity component in a second axis, the y-direction, remains relatively high as illustrated by permittivity plot line 706. Permittivity Plot line 708 illustrates that the out-of-plane permittivity, remains relatively low and close to that of the binder as well as the same as that of the permittivity of the plate-like aluminum metallic flake 150 as the thickness in the Z-axis, direction of propagation of the radar signal, has not changed.

Turning now to FIG. 8, the graph 800 illustrates the effect of permittivity on transmit signal amplitude distortion for plate-like morphology of aluminum flake and acicular morphology of aluminum flake across azimuth angles from −90 degrees, through 0 degrees, to 90 degrees. The flake-like and acicular morphology additives both included aluminum, dispersed in a conventional binder. Further, the EM-simulation were performed by emitting a radio frequency of 76.5 GHz. As illustrated, the transmitted signal loss is greater for the aluminum flake plate-like particles depicted by plot line 802 than the acicular shaped aluminum flake depicted by plot line 804. In signal amplitude plot line 802, increasing loss in the signal is seen as the reflected radio waves depart from 0 degrees with the aluminum flake plate-like particles. Such loss may result in a reduction in sensing sensitivity, as indicated on FIG. 5D, and an increase in the rate of false alarms, where the system identifies objects are present that are not present. The loss for the acicular aluminum flake particles illustrated by plot line 804 is small and remains relatively consistent across the azimuth angles significantly improves the radar sensing range coverage loss. As shown in FIG. 5D, a total transmission loss of 10 decibels may lead to a radar sensing range coverage map degradation of 44 percent, a total transmission loss 5 decibels may lead to a radar sensing range coverage map degradation of 25.5 percent, a total transmission loss of 3 decibels may lead to a radar sensing range coverage map degradation of 16.5 percent, and a total transmission loss of 2 decibels may lead to a radar sensing range coverage map degradation of 11.8 percent.

FIG. 9 includes a graph 900 that illustrates the effect of radar signal phase distortion due to the use of plate-like and acicular flake morphology across azimuth angles from −90 degrees, through 0 degrees, to 90 degrees. The flake-like and acicular morphology additives both included aluminum, dispersed in a conventional binder. Further, the simulations were performed by emitting a radio frequency of 76.5 GHz. As seen, the plate-like aluminum flake exhibited greater signal phase distortion from zero degrees depicted by plot line 902 than the acicular aluminum flake depicted by plot line 904. Signal phase distortion may introduce inaccurate radar target angle measurement as indicated on FIG. 5C.

The coating additives and coatings described herein offer several advantages. Some of these advantages include enabling the use of high metallic flake content in paints used on components that package radar sensors. Additional advantages include reducing total signal transmission loss and distortions in the detected radar radio waves that otherwise may result in degradation of radar sensing range coverage map, measurement errors and false alarms increase, i.e., mis-detection (or not-identification of in-traffic existing object, identification of in-traffic non-existent objects, incorrect identification of vehicle location relative to lines of traffic, as well as other measurement problems (or artifacts).

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A radar packaging component, comprising:
   a substrate; and
   a coating affixed on the substrate, the coating including a binder, and a plurality of acicular flake particles dispersed in the binder,
   wherein the plurality of acicular flake particles exhibit a thickness, a width, and a length, and a largest cross-sectional area is defined by the width and the length,
   wherein the largest cross-sectional area is aligned parallel to a first plane defined by a first axis and a second axis, in plane with a radar electric field, the length of at least 30 percent by volume of the acicular flake particles are oriented along a second axis, and the thickness is oriented in a third axis, where the third axis defines a signal propagation direction of a radar sensor and the third axis is perpendicular to the first plane,
   wherein the acicular flake particles are dispersed in the binder in layers and the layers are formed along the third axis and the acicular flake particles are aligned relative to each other in the first axis and second axis in each layer such that the acicular flake particles appear stacked along the third axis, and
   the length of the acicular flake particles is in the range of 5 micrometers to 100 micrometers, a width of the acicular flake particles is in the range of 1 micrometer to 20 micrometers, and the thickness of the acicular flake particles is in the range of 0.1 micrometers to 5 micrometers.

2. The radar packaging component of claim 1, wherein the coating exhibits a metallic finish.

3. The radar packaging component of claim 2, wherein the acicular flake particles are present in a range of 10 percent to 40 percent of the total volume of the binder and acicular metallic flake particles.

4. The radar packaging component of claim 3, wherein the ratio of the average length to average width is in the range of 4:1 to 100:1 and the ratio of the average width to average thickness is in the range of 10:1 to 1000:1.

5. The radar packaging component of claim 4, wherein the acicular flake particles are acicular metallic flake particles including one or more of the following: metal particles, metal alloy particles, and metal-polymer film composites.

6. The radar packaging component of claim 5, wherein the metals and metal alloys include one or more of the following metals: silver, tin, iron, bronze, copper, silicon, aluminum, and zinc.

7. The radar packaging component of claim 1, wherein the acicular flake particles include one or more of graphene, semiconductors, mica particles, titanium oxide, strontium aluminate, chromium oxide, silica, iron oxide, tin oxide, tin dioxide, ferric ferrocyanide, manganese violet, ultramarine blue, carbon black, and titanium dioxide.

8. The radar packaging component of claim 1, further comprising a radar sensor positioned behind the radar packaging component and emits radio waves in one of the following bands: of 24, 76, 79, 90, 120, 140 and 240 GHz.

9. The radar packaging component of claim 8, wherein the radar packaging is one of the following components: a bumper facia, a grill, an emblem, a windshield, a window, an exterior light, and an electronic device.

10. A vehicle, comprising:
    a radar packaging component; and
    a radar sensor positioned under the radar packaging component, the radar packaging component including:
    a substrate, and
    a coating affixed on the substrate, the coating including a binder, and a plurality of acicular flake particles dispersed in the binder, wherein the acicular flake particles exhibit a thickness, a width, and a length, and a largest cross-sectional area, defined by the width and the length, is aligned parallel to a first plane defined by a first, x-axis and a second, y-axis, in plane with a radar electric field, the length of at least 30 percent by volume of the acicular flake particles is oriented in a second, y-axis, and the thickness is oriented in a third, z-axis, where the third, z-axis defines a signal propagation direction of the radar sensor and the third, z-axis is perpendicular to the first plane, and the acicular flake particles are dispersed in the binder in layers and the layers are formed along the third, z-axis, and the acicular flake particles are aligned relative to each other in the first, x-axis and y-second axis in each layer such that the acicular flake particles appear stacked along the third axis, and the length of the acicular flake particles is in the range of 5 micrometers to 100 micrometers, a width of the acicular flake particles is in the range of 1 micrometer to 20 micrometers, and the thickness of the acicular flake particles is in the range of 0.1 micrometers to 5 micrometers.

11. The vehicle of claim 10, wherein the coating exhibits a metallic finish.

12. The vehicle of claim 11, wherein the radar packaging component is one of the following components: a bumper facia, a grill, an emblem, a windshield, a window, and an exterior light.

13. The vehicle of claim 12, wherein the radar packaging component is a bumper facia.

14. The vehicle of claim 13, further comprising a bracket holding the radar sensor to the bumper facia.

15. The vehicle of claim 14, wherein the acicular flake particles are present in a range of 10 percent to 40 percent of the total volume of the binder and acicular flake particles.

16. The vehicle of claim 15, wherein the ratio of the average length to average width is in the range of 4:1 to 100:1 and the ratio of the average width to average thickness is in the range of 10:1 to 1000:1.

17. The vehicle of claim 16, wherein the acicular metallic flake particles include one or more of the following: metal particles, metal alloy particles, and metal-polymer film composites.

18. The vehicle of claim 17, wherein the metals and metal alloys include one or more of the following metals: silver, tin, iron, bronze, copper, silicon, aluminum, and zinc.

19. The vehicle of claim 12, wherein the radar packaging component is a bumper facia, the coating exhibits a metallic finish, the acicular metallic flake particles are present in a range of 10 percent to 40 percent of the total volume of the binder and acicular metallic flake particles, and the coating exhibits a first permittivity in the first axis that is about 25 percent of a second permittivity of the coating in a second axis, wherein the second axis is perpendicular to the first axis.

20. The vehicle of claim 15, wherein the acicular flake particles include one or more of graphene, semiconductors, mica particles, titanium oxide, strontium aluminate, chromium oxide, silica, iron oxide, tin oxide, tin dioxide, ferric ferrocyanide, manganese violet, ultramarine blue, carbon black, and titanium dioxide.

* * * * *